United States Patent
Pons et al.

(10) Patent No.: US 12,286,926 B2
(45) Date of Patent: Apr. 29, 2025

(54) RECOVERED-CYCLE AIRCRAFT TURBOMACHINE

(71) Applicant: SAFRAN HELICOPTER ENGINES, Bordes (FR)

(72) Inventors: Bernard Claude Pons, Moissy-Cramayel (FR); Alphonse Puerto, Moissy-Cramayel (FR); Laurent Pierre Tarnowski, Moissy-Cramayel (FR); Lois Pierre Denis Vive, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 74 days.

(21) Appl. No.: 18/001,441
(22) PCT Filed: Jun. 15, 2021
(86) PCT No.: PCT/FR2021/051075
§ 371 (c)(1),
(2) Date: Dec. 9, 2022
(87) PCT Pub. No.: WO2021/255383
PCT Pub. Date: Dec. 23, 2021

(65) Prior Publication Data
US 2023/0220800 A1 Jul. 13, 2023

(30) Foreign Application Priority Data
Jun. 17, 2020 (FR) .................................. 2006309

(51) Int. Cl.
*F02C 7/08* (2006.01)
*F02C 3/08* (2006.01)
(Continued)

(52) U.S. Cl.
CPC ............... *F02C 3/103* (2013.01); *F02C 3/08* (2013.01); *F02C 7/08* (2013.01); *B64C 27/12* (2013.01);
(Continued)

(58) Field of Classification Search
CPC ...................................................... F02C 6/12
(Continued)

(56) References Cited

U.S. PATENT DOCUMENTS 2,801,043 A * 7/1957 Spotz .................... F01D 25/145
417/406
4,008,010 A * 2/1977 Fauconnet ................ F03B 3/10
415/910
(Continued)

FOREIGN PATENT DOCUMENTS

CH        248924 A     5/1947
CN    203346357 U  * 12/2013
(Continued)

OTHER PUBLICATIONS

International Search Report received for PCT Patent Application No. PCT/FR2021/051075, mailed on Sep. 13, 2021, 5 pages (2 pages of English Translation and 3 pages of Original Document).

*Primary Examiner* — Todd E Manahan
*Assistant Examiner* — Marc Amar
(74) *Attorney, Agent, or Firm* — WOMBLE BOND DICKINSON (US) LLP

(57) ABSTRACT

Aircraft turbomachine including a centrifugal compressor, a combustion chamber, the combustion chamber being supplied by the compressor via a diffuser and via a straightener, and a heat exchanger, the exchanger including a first circuit, supplied with exhaust gas from the turbomachine, and a second circuit, which are connected by volutes on the one hand to an outlet of the diffuser and on the other hand to an inlet of the straightener, the volutes having reversed winding directions such that their connection ports to the exchanger are independent of one another and are substantially diametrically opposed, and such that the minimum cross section of each duct is situated at a larger cross section of the other duct.

21 Claims, 5 Drawing Sheets

(51) Int. Cl.
  *F02C 3/10* (2006.01)
  *B64C 27/12* (2006.01)
  *F04D 29/42* (2006.01)
(52) U.S. Cl.
  CPC .... *F04D 29/4233* (2013.01); *F05D 2220/329* (2013.01)
(58) Field of Classification Search
  USPC ...................................................... 415/224.5
  See application file for complete search history.

(56) References Cited

U.S. PATENT DOCUMENTS

| | | | | |
|---|---|---|---|---|
| 4,040,249 | A * | 8/1977 | Kahle | F01D 25/162 165/8 |
| 4,181,466 | A * | 1/1980 | Owen | F04D 29/624 415/207 |
| 4,936,097 | A * | 6/1990 | Rodgers | F02C 6/12 417/406 |
| 4,981,018 | A * | 1/1991 | Jones | F02C 3/08 60/726 |
| 5,722,229 | A * | 3/1998 | Provost | F02C 3/113 60/785 |
| 2005/0235627 | A1* | 10/2005 | Vandermolen | F02C 7/08 60/39.511 |
| 2011/0146991 | A1* | 6/2011 | Palamara | C01B 3/48 166/303 |
| 2014/0318151 | A1* | 10/2014 | Honnorat | F01D 9/026 415/204 |
| 2014/0377059 | A1* | 12/2014 | Ulrey | F01D 9/026 415/205 |
| 2017/0101968 | A1* | 4/2017 | Hayashi | F02M 35/10157 |
| 2017/0159565 | A1* | 6/2017 | Evulet | F02K 1/002 |
| 2019/0049114 | A1* | 2/2019 | Monty | F02C 7/10 |

FOREIGN PATENT DOCUMENTS

| | | |
|---|---|---|
| EP | 2799666 A2 | 11/2014 |
| JP | 2012057592 A * | 3/2012 |

* cited by examiner

RECOVERED-CYCLE AIRCRAFT TURBOMACHINE

TECHNICAL FIELD OF THE INVENTION

The present invention relates to an aircraft turbomachine equipped with a volute assembly for the implementation of a recovered cycle.

TECHNICAL BACKGROUND

An aircraft turbomachine comprises a gas generator comprising, from upstream to downstream in the flow orientation of the gases, at least one compressor, an annular combustion chamber, and at least one turbine. The compressor is supplied with air and compresses it. The compressed air is mixed with fuel and burned in the combustion chamber, which supplies combustion gases to the turbine. These combustion gases expand in the turbine and rotate its rotor, which in turn drives the rotor of the compressor by means of a common shaft.

A turbomachine may be equipped with one or more spools, each comprising a compressor rotor connected by a shaft to a turbine rotor.

There are also turbomachines with a free turbine which is mounted downstream of the spool or spools of the turbomachine. A turbine is free as long as its rotor is not connected by a shaft to a compressor rotor.

It is thus understood that a turbomachine may comprise several successive compressors (e.g., a low-pressure compressor followed by a high-pressure compressor), as well as several successive turbines (e.g., a high-pressure turbine followed by a free turbine or a low-pressure turbine).

In the present application, a conventional cycle turbomachine is defined as a turbomachine in which the compressed air leaving the compressor or compressors supply directly the combustion chamber.

On the other hand, a recovered-cycle turbomachine is a turbomachine in which the combustion gases flowing out of the turbine or turbines are used to heat the compressed air leaving the compressor or compressors and intended to supply the combustion chamber. This technology allows to improve the performance of the turbomachine because the amount of fuel required to reach the operating temperature of the turbomachine is less than that required in the scope of a conventional cycle turbomachine.

FIG. 1 shows a very schematic representation of a recovered-cycle turbomachine.

The turbomachine 1 comprises from upstream to downstream a compressor 2, an annular combustion chamber 3, a turbine 4 and a free turbine 5. The rotors of the compressor 3 and the turbine 4 are connected together by a shaft 6 and form a single spool.

The turbomachine 1 comprises a heat exchanger 7, a first circuit of which is supplied with combustion gases collected from the outlet of the free turbine 5. The exchanger 7 comprises a second circuit which is supplied with compressed air leaving the compressor 2 and which supplies heated compressed air to the combustion chamber 3.

The integration of this technology can be complicated when the compressor 2 is a centrifugal type. A centrifugal compressor is a compressor that has an inlet oriented parallel to the longitudinal axis of the turbomachine, and an outlet that is oriented radially with respect to this axis.

This type of compressor is associated with a system of diffusion and rectification of the compressed air flow. This system comprises a diffuser-rectifier assembly and thus comprises an annular diffuser that is substantially radially oriented and aligned with the outlet of the centrifugal compressor, and an annular rectifier that is substantially axially oriented to direct the flow of compressed air towards the combustion chamber.

An integration solution for this technology has been proposed in the past and consists of using an assembly of two volutes.

A volute is a conduit that is wound spirally around an axis and whose fluid passage cross-section evolves. In the scope of the present application, a volute comprises an annular conduit wound around the longitudinal axis of the turbomachine and connected to a first port located at the external periphery of the conduit and oriented in a tangential direction, and a second port located at the internal periphery of the conduit and oriented in a radial direction.

A first volute has its second port connected to the outlet of the diffuser and its first port supplying the inlet of the second circuit of the exchanger. The outlet of this second circuit is connected to the first port of the second volute, the second port of which is connected to the inlet of the rectifier.

The solution proposed in the past is to first interlock the volutes, from their first ports, which are paired, to the circumferential ends of the smallest cross-section of the conduits. The solution is also to move the volutes as close as possible to the centrifugal compressor and the combustion chamber.

However, this solution has many disadvantages.

First of all, although it is advantageous from an overall dimension point of view to join the volutes to one another, or even to place them next to each other, this is very disadvantageous, particularly from an energy and performance point of view, when the volutes are nested inside each other. Indeed, the more the volutes are nested in each other, the greater the risk of thermal exchange between the flows circulating in the conduits of the two volutes. The compressed air that is heated by the exchanger and circulates through the second volute is then cooled by the cooler compressed air that is intended to be supplied to this exchanger and circulates through the first volute. Pairing the first ports accentuates this phenomenon as the hottest circumferential end of the first volute is located at the level of the coldest circumferential end of the second volute.

On the other hand, the proposed solution involves significant modifications to the turbomachine and therefore relatively high costs. For example, a complete redesign of the combustion chamber is required. This is also the case for the rectifier, which must be reconfigured to precisely control the speed (and in particular the Mach) and the gyration of the air flow supplying the combustion chamber.

The prior art also comprises the documents EP-A2-2799666, US-A1-2005/235627 and CH-A-248924.

The present invention proposes a solution to the above problems for integrating a volute assembly into a turbomachine without major changes to the latter, thereby allowing a conventional cycle turbomachine to be converted to a recovered-cycle turbomachine.

SUMMARY OF THE INVENTION

According to a first aspect, the invention concerns an aircraft turbomachine, comprising:
 a centrifugal compressor extending around an axis A,
 an annular combustion chamber extending around the axis A, a system for diffusing and rectifying an air flow leaving the centrifugal compressor to supply the combustion chamber, this system comprising:
  an annular diffuser which is oriented substantially radially and which comprises an inlet supplied by the centrifugal compressor, and
  an annular rectifier which comprises an outlet for supplying the combustion chamber, and
a heat exchanger, this exchanger comprising:
  a first circuit supplied with exhaust gases from the turbomachine, and
  a second circuit comprising an inlet connected by a first volute to an outlet of the diffuser, and an outlet connected by a second volute to an inlet of the rectifier, the first and second volutes being joined together and each comprising an annular conduit wound around the axis A and connected to a first port located at the external periphery of the conduit and oriented in a tangential direction and a second port located at the internal periphery of the conduit and oriented in a radial direction, the conduit of each of the volutes having an evolving passage cross-section and which is maximum at the level of the first port and minimum at a circumferential end of the conduit opposite the first port,
characterised in that the volutes have reversed winding directions so that their first ports are formed by conduit portions spaced apart from each other and the minimum cross-section of each conduit is located at the level of a larger cross-section of the other conduit.

The volutes are thus configured and arranged to optimise their overall dimension while limiting the thermal exchanges between the fluids circulating in their conduits. The first port of the first volute makes circulate a colder flow than the fluid circulating in the first port of the second volute and does not risk cooling this last fluid due to the distance provided between these first ports. The volutes are also advantageously designed to facilitate their integration into the turbomachine while limiting the impact on the latter, i.e., by limiting the structural modifications to it.

Advantageously, the turbomachine is a turboshaft engine, the turboshaft engine being intended, for example, to drive the rotary wing of a helicopter.

The turbomachine according to the invention may comprise one or more of the following steps or characteristics, considered independently or in combination with each other:
  each of the volutes has circular or oval shaped passage cross-sections extending over an angle of at least 220°, the passage cross-section of the first volute is not nested in the passage cross-section of the other volute;
  the second port of each volute comprises two annular walls extending about the axis A and defining between them an air passage duct;
  the two walls of the second port are substantially parallel and project from an annular skin of the volute, this skin extending around the axis A and having in axial cross-section a circular or oval shape to form said conduit;
  one of the walls of the second port of the first volute is coincident with one of the walls of the second port of the second volute;
  the walls of the second port of the first volute have free ends opposite the skin, which define a substantially radially oriented connector for connection to the outlet of the diffuser, and the walls of the second port of the second volute have free ends opposite the skin, which define a substantially axially oriented connector for connection to the rectifier inlet;
  the walls of the second ports have flat shapes and perpendicular to the axis A, or have frustoconical shapes converging from upstream to downstream towards the interior;
  the skin and the walls have approximately a same thickness;
  the turbomachine further comprises an external casing which extends around the axis A and surrounds the combustion chamber, the volutes being spaced from the casing and attached to the latter by flanges.

The present invention also relates to a volute assembly for a turbomachine according to one of the preceding claims, this assembly comprising first and second volutes which are joined together and each comprise an annular conduit wound around the axis A and connected to a first port located at the external periphery of the conduit and oriented in the tangential direction, and a second port located at the internal periphery of the conduit and oriented in the radial direction, the conduit of each of the volutes having an evolving passage cross-section which is maximum at the level of the first port and minimum at a circumferential end of the conduit opposite the first port, characterised in that the volutes have reversed winding directions so that their first ports are formed by conduit portions spaced apart from each other and the minimum cross-section of each conduit is located at the level of a larger cross-section of the other conduit.

In a particular embodiment of the invention, the first ports of the volutes are connected to each other by a bypass conduit.

The invention also proposes a method for manufacturing an aircraft turbomachine, this turbomachine comprising:
  a centrifugal compressor extending around an axis A,
  an annular combustion chamber extending around the axis A,
  a system for diffusing and rectifying an air flow leaving the centrifugal compressor to supply the combustion chamber, this system comprising:
    an annular diffuser which is oriented substantially radially and which comprises an inlet supplied by the centrifugal compressor, and
    an annular rectifier which comprises an outlet for supplying the combustion chamber, characterised in that it comprises the steps consisting in:
  a) determining a cycle of the turbomachine, from a conventional cycle and a recovered cycle, and
  b2) in the case of a recovered cycle, equipping the turbomachine with an assembly of volutes as described above, a first of the volutes having its second port connected to the outlet of the diffuser, and the second of the volutes having its second port connected to the inlet of the rectifier.

According to a second aspect, the invention relates to a method for manufacturing an aircraft turbomachine, this turbomachine comprising:
  a centrifugal compressor extending around an axis A,
  an annular combustion chamber extending around the axis A,
  a system for diffusing and rectifying an air flow leaving the centrifugal compressor to supply the combustion chamber, this system comprising:
    an annular diffuser which is oriented substantially radially and which comprises an inlet supplied by the centrifugal compressor, and an annular rectifier which comprises an outlet for supplying the combustion chamber, characterised in that it comprises the steps consisting in:
a) determining a cycle of the turbomachine, from a conventional cycle and a recovered cycle, and
b1) in the case of a conventional cycle, connect an outlet of the diffuser to an inlet of the rectifier,
b2) in the case of a recovered cycle, equipping the turbomachine with an assembly of two volutes each comprising an annular conduit wound around the axis A, each volute comprising a first port located at the external periphery of the conduit and oriented in the tangential direction, and a second port located at the internal periphery of the conduit and oriented in the radial direction, a first of the volutes having its second port connected to the outlet of the diffuser, and the second of the volutes having its second port connected to the inlet of the rectifier.

It is therefore understood that the turbomachine has a common basic structure that can be used to manufacture a conventional or recovered-cycle turbomachine. This is particularly advantageous as it facilitates the design of the turbomachine and limits the number of its parts and references.

The method according to the invention may comprise one or more of the following steps or characteristics, considered independently or in combination with each other:
  in the step b1), the outlet of the diffuser is directly connected to the inlet of the rectifier;
  in the step b1), the outlet of the diffuser is connected to the inlet of the rectifier by an annular connecting element which extends around the axis X and defines an air passage duct which is generally U-shaped in axial cross-section;
  the annular element comprises a first annular connector which is oriented radially inwardly with respect to the axis and which is connected to the outlet of the diffuser, and a second annular connector which is oriented substantially axially and which is connected to the inlet of the rectifier, the first and second connectors being respectively located at the ends of the U-shaped duct;
  in the step b2), the first and second volutes are joined together, the conduit of each of the volutes having an evolving passage cross-section which is maximum at the level of the first port and minimum at a circumferential end of the conduit opposite the first port;
  the volutes have reversed winding directions so that their first ports are formed by portions of conduits spaced apart from each other and the minimum cross-section of each conduit is located at the level of a larger cross-section of the other conduit;
  in the step b2), the turbomachine is also equipped with a heat exchanger which comprises:
    a first circuit supplied with exhaust gases from the turbomachine, and
    a second circuit comprising an inlet connected to the first port of the first volute, and an outlet connected to the first port of the second volute.
  in the step b2), the volute assembly is formed in one single part and fitted and clamped to an external casing of the turbomachine which surrounds said combustion chamber;
  after the step b2), the turbomachine is converted from a recovered cycle to a conventional cycle, with the first ports of the volutes being connected to each other by a bypass conduit.

BRIEF DESCRIPTION OF THE FIGURES

Further characteristics and advantages of the invention will become apparent from the following detailed description, for the understanding of which reference is made to the attached drawings in which.

DETAILED DESCRIPTION OF THE INVENTION

Figure 1:
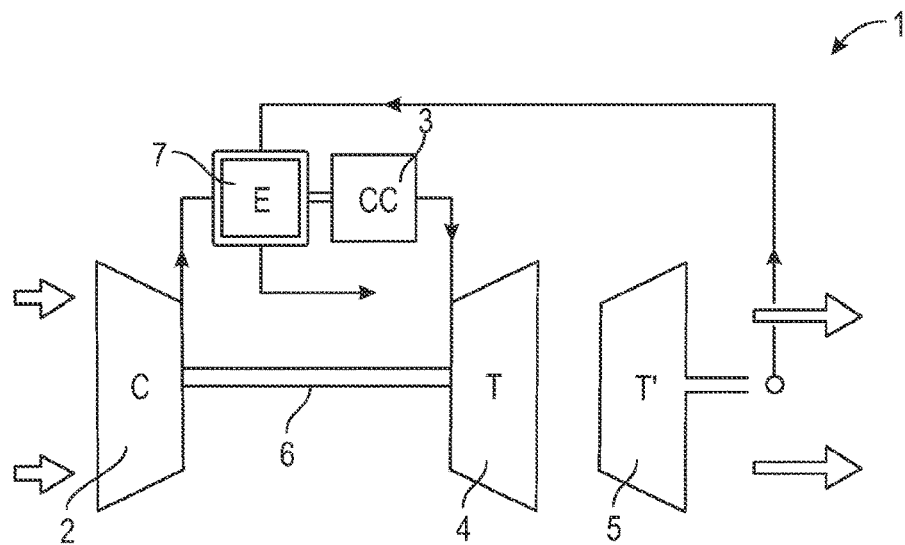
FIG. 1 is a very schematic view of a recovered-cycle aircraft turbomachine.

FIG. 1 has already been described above.

FIGS. 2 to 4, 5a and 5b illustrate a first embodiment of an aircraft turbomachine 10 according to the invention.

The turbomachine 10 is partially shown in FIG. 1 and conventionally comprises at least one compressor, an annular combustion chamber and at least one turbine.

In the example shown, the turbomachine 10 comprises two successive compressors 12, 14 which are therefore mounted one after the other and are both of the centrifugal type.

The compressors 12, 14 are annular in shape and are coaxial and centred on an axis A which is the longitudinal axis of the turbomachine 10. Each compressor 12, 14 comprises a stator 16 and a bladed rotor 18, referred to as impeller, which rotates within the stator 16 and about the axis A.

Each compressor 12, 14 comprises an inlet 20 oriented axially upstream and an outlet 22 oriented radially outward with respect to the axis A. The terms upstream and downstream here refer to the general flowing of the air and the gases in the turbomachine 10.

The compressor 14 is thus located downstream of the compressor 12.

Figure 2:
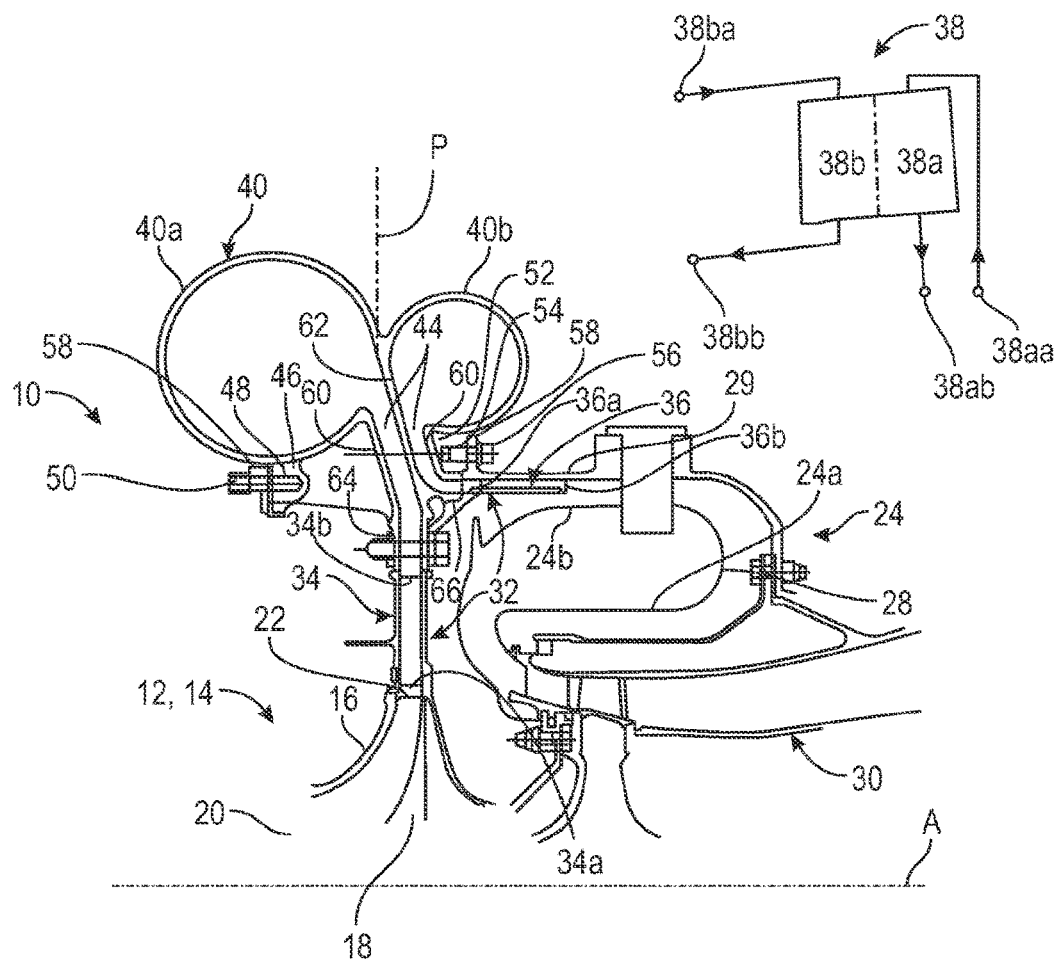
FIG. 2 is a partial schematic view in axial cross-section of a recovered-cycle aircraft turbomachine, according to a first embodiment of the invention.

The turbomachine 10 in FIG. 2 further comprises a combustion chamber 24 which is located downstream of the compressor 14.

A combustion chamber 24 comprises two annular walls, respectively internal 24a, and external 24b, which define between them an annular cavity into which compressed air from the compressor 14 and fuel from injectors 26 are injected and mixed.

The walls 24a, 24b are connected to each other by a chamber bottom 28 which is annular in shape and comprises orifices (not visible) for the passage of compressed air from the compressor 14 to supply the chamber 24.

The combustion chamber 24 is surrounded by an external annular casing 29 which carries the injectors 26 in particular.

In the example shown, the chamber 24 is of the inverted type as its chamber bottom 28 is located on the downstream side of this chamber. The outlet of the chamber 24 is located on the upstream side of the chamber and is connected to one or more turbines 30 located downstream of the chamber.

The combustion gases injected into the turbine 30 expand and drive its rotor, which is connected by a shaft to the rotor 18 of at least one of the compressors 12, 14 in order to drive them in rotation about the axis A.

The combustion gases are then evacuated into an exhaust nozzle of the combustion gases which is not shown.

In a conventional cycle turbomachine 10, the connection from the outlet of the compressor 14 to the combustion chamber 24 is carried out by an air diffusing and rectifying system 32, also referred to as a diffuser-rectifier.

This system 32 comprises:
- an annular diffuser 34 which is oriented substantially radially and which comprises at its internal periphery an inlet 34a supplied by the compressor 14 and aligned radially with the outlet 22 thereof, and an outlet 34b at its external periphery which opens radially outwards; and
- an annular rectifier 36 which is substantially axially oriented in the example shown and which comprises at its upstream end an inlet 36a, and at its downstream end an outlet 36b for supplying the combustion chamber 24.

The diffuser 34 is located upstream of the chamber 24 and its walls 24a, 24b and the rectifier 36 extends around the chamber 24 and its walls 24a, 24b and inside of the casing 29. The diffuser 34 may be clamped to the stator 16 of the compressor 12 and/or the compressor 14. The rectifier 36 can be clamped to the casing 29.

The diffuser 34 and the rectifier 36 can be bladed.

In a conventional cycle turbomachine 10, the outlet 34b of the diffuser 34 is directly connected, for example by an L-bend conduit to the inlet 36a of the rectifier 36. Alternatively, the compressed air leaving the compressor 14 supply directly the combustion chamber 24.

According to the invention, the turbomachine 10 is of the recovered-cycle type which means that the compressed air leaving the compressor 14 is heated before being injected into the combustion chamber 24.

The compressed air is heated by means of a heat exchanger 38 on the one hand and an assembly of two volutes 40 on the other.

The heat exchanger 38 is schematically shown and essentially comprises two circuits 38a, 38b, namely:
- a first circuit 38a, an inlet 38aa of which is connected to means for collecting exhaust gases from the outlet of the turbines 30 or from the aforementioned exhaust nozzle, and an outlet 38ab which can also be connected to the exhaust nozzle for the purpose of releasing these gases into the atmosphere, and
- a second circuit 38b comprising an inlet 38ba and an outlet 38bb connected to the volute assembly 40.

Figure 3:
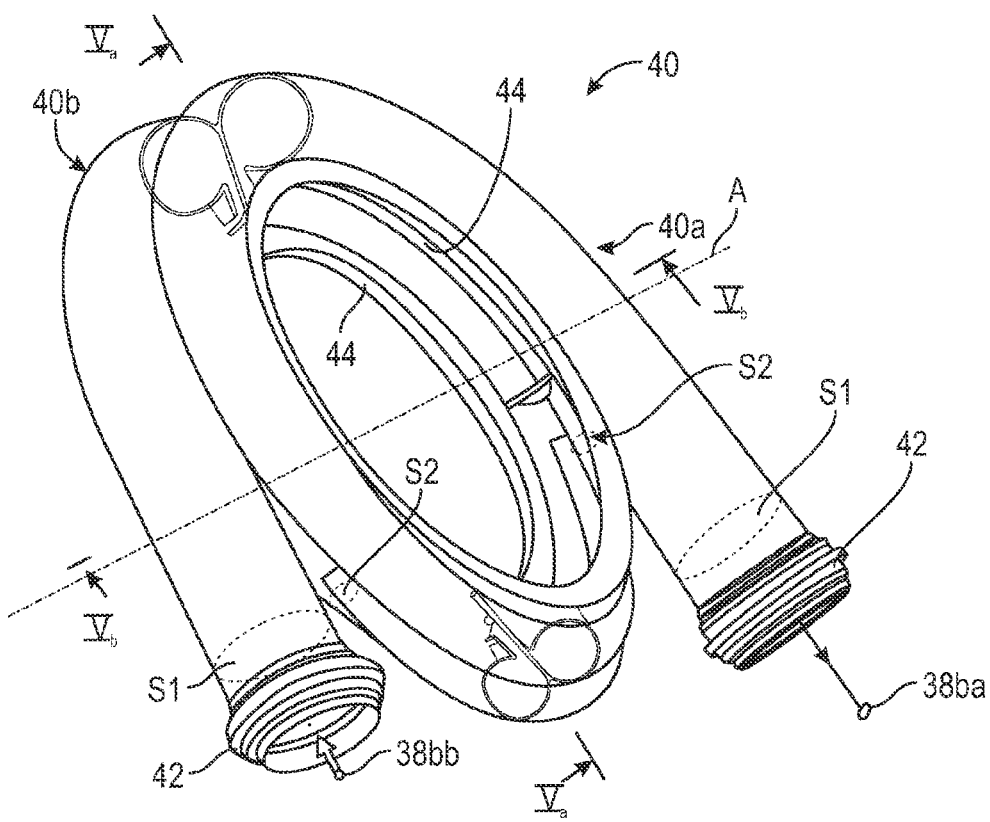
FIG. 3 is a schematic perspective view of a volute assembly according to the invention.
Figure 4:
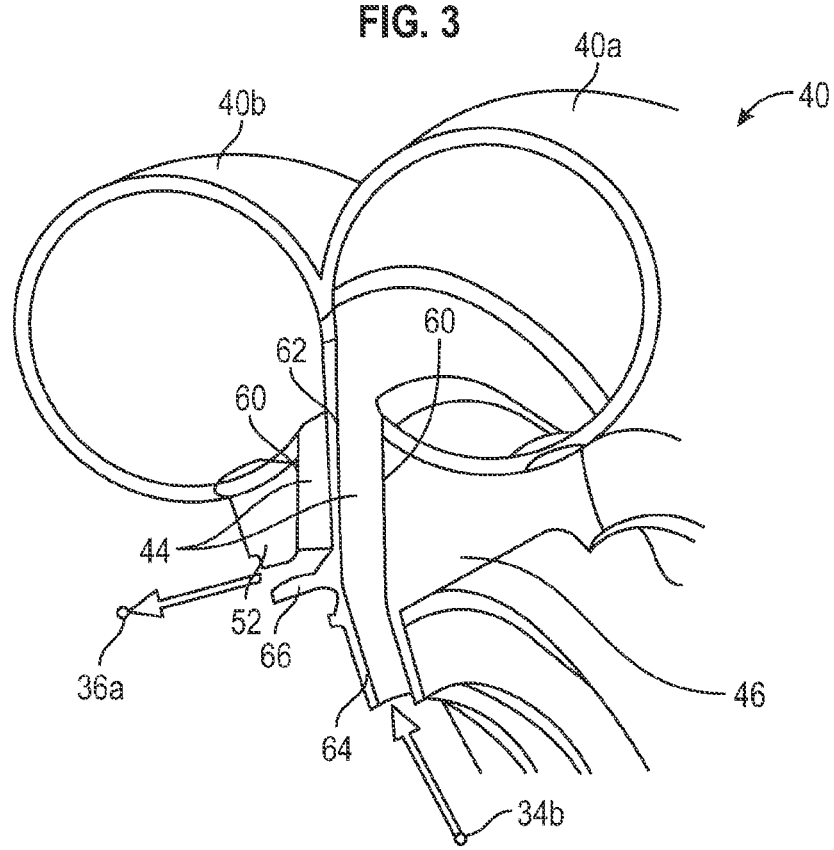
FIG. 4 is a schematic axial sectional view of the volute assembly in FIG. 3.

The volute assembly 40 is shown in its entirety in FIG. 3 and in cross-section in FIGS. 2, 4, 5a and 5b.

The assembly 40 comprises two volutes 40a, 40b, which are in this case joined together and coaxial.

Each volute 40a, 40b comprises a conduit wound in a spiral around an axis which is here the axis A, preferably over at least 360° so that the conduit makes at least one revolution on itself.

Each volute 40a, 40b comprises a first port 42 located at the external periphery of the conduit and oriented in a tangential direction, and a second port 44 located at the internal periphery of the conduit and oriented in a substantially radial direction.

The passage cross-section of the conduit evolves around its circumference, preferably gradually. The passage cross-section is maximum S1 at the level of the first port 42 of each volute 40a, 40b and minimum S2 at the level of the circumferential end of the conduit opposite the first port 42.

The volute assembly 40 is connected to the diffuser 34, the rectifier 36 and the exchanger 38 as follows. The volute 40a has its second port 44 connected to the outlet 34b of the diffuser 34 and its first port 42 supplying the inlet 38ba of the second circuit 38b of the exchanger 38. The outlet 38bb of this second circuit 38b is connected to the first port 42 of the second volute 40b, the second port 44 of which is connected to the inlet 36a of the rectifier 36.

In the example shown, the volute 40a is located upstream of the volute 40b. The volutes 40a, 40b each have a circular or oval passage cross-section, preferably over their entire circumferential extent. Oval shape means any elliptical or ovoid shape, or oblong shape. However, other forms are possible.

The volutes 40a, 40b are joined together and preferably not nested in each other so as to limit the thermal exchanges between the air flows circulating simultaneously in the two volutes. This means that the passage cross-section of one volute does not overlap with the passage cross-section of the other volute. In this case, this means that the passage cross-section of each volute is almost complete through 360°. For example, it is perfectly circular or almost perfectly circular in the case of a circular passage cross-section. More precisely, the angle β is defined as the minimum angle around which the cross-section of the volute extends (see FIG. 5B). This angle is at least 220° and preferably as close to 360° as possible In addition, the volutes 40a, 40b extend around and away from the casing 29 and are clamped to the latter, as will be detailed below.

The plane P is defined as a plane of junction of the volutes 40a, 40b, this plane passing between the volutes and being perpendicular to the axis A. The plane P here extends just upstream of the diffuser 34.

The conduit of each volute 40a, 40b comprises an annular skin which defines the aforementioned passage cross-section and which has a substantially constant thickness, both over its circumferential extent around the axis A and also over its entire extent when considering an axial cross-section of the conduit, as seen in FIG. 2 for example.

Figure 5A:
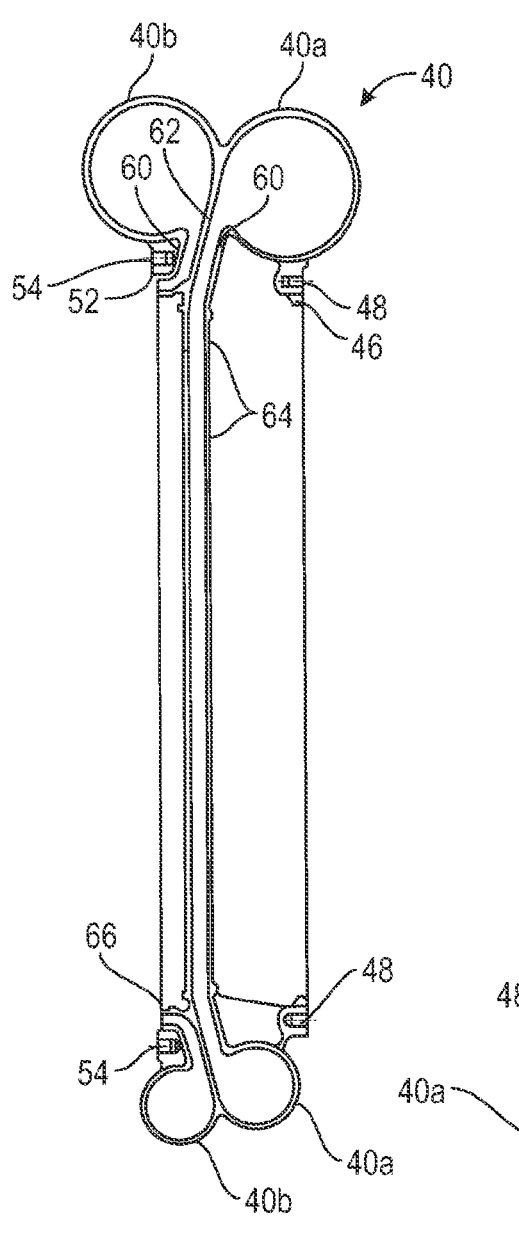
FIGS. 5a and 5b show further schematic axial sectional views of the assembly shown in FIG. 3.
Figure 5B:
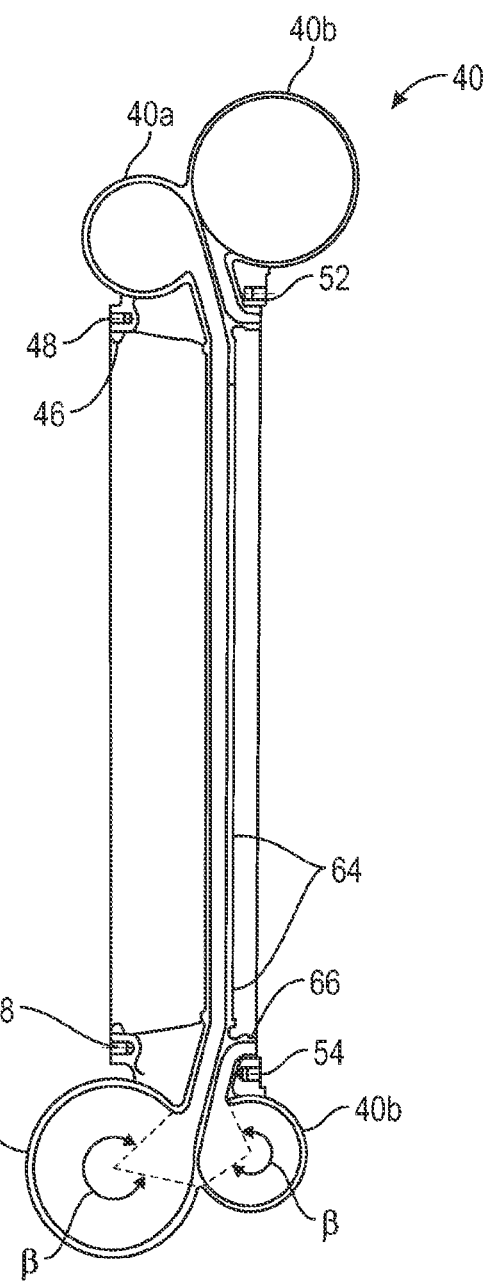

As can be seen more clearly in FIGS. 2, 5a and 5b, a first annular boss 46 is located at the internal periphery of the volute 40a and comprises blind and threaded screw holes 48 for screws 50. A second annular boss 52 is located at the internal periphery of the volute 40b and comprises blind and threaded screw holes 54 for screws 56.

The bosses 46, 50 are applied against annular flanges 58 of the casing 29 or another external casing of the turbomachine, these flanges 58 comprising passage orifices for the screws 50, 56. The screws 50, 56 are axially oriented and evenly spaced around the axis A. The volutes 40a, 40b are thus clamped.

The volutes 40a, 40b have reversed winding directions so that their ports 42 are formed by spaced apart conduit portions. The ports 42 are independent of each other and are spaced apart and for example substantially diametrically opposite each other with respect to the axis A.

Thus, the minimum cross-section S2 of each conduit is located at the level of a larger cross-section of the other conduit. The maximum cross-section S1 of each conduit is located at the level of a smaller cross-section of the other conduit. This can be seen in FIG. 3 in particular.

As can also be seen in FIG. 3, the ports 42 are each generally tubular in shape and are coupled to the inlet 38ba and outlet 38bb of the exchanger 38 respectively by suitable means.

The second port 44 of each volute 40a, 40b comprises two annular walls 60, 62 extending around the axis A and defining an air passage duct between them.

The walls 60, 62 are substantially parallel and project radially inwards from the junction plane P of the volutes and from the annular skins of the volutes. In the example shown, the walls 60, 62 are frustoconical and converge from upstream to downstream radially inwards. The walls 60, 62 are therefore inclined with respect to the plane P.

In the example shown, the volute assembly 40 is formed in a single part. The volutes 40a, 40b and their ports 42, 44 are thus formed in a single part.

In the case shown, this means that the walls 62 of the two ports 44 are merged.

The walls 60, 62 of the volute 40a have free ends opposite the conduit, which define a substantially radially oriented connector 64 to the outlet 34b of the diffuser 34. This connector 64 is annular in shape and may be attached by screws or the like to the casing 29 or another casing of the turbomachine.

The walls 60, 62 of the volute 40b have free ends opposite the conduit, which define a substantially axially oriented connector 66 for connection to the inlet 36a of the rectifier 36. This connector 66 is annular in shape and can be joined to the boss 52 and attached by means of this boss to the casing 29.

In the example shown, the walls 60, 62 have a similar or identical thickness to the skins of the conduits.

Figure 6:
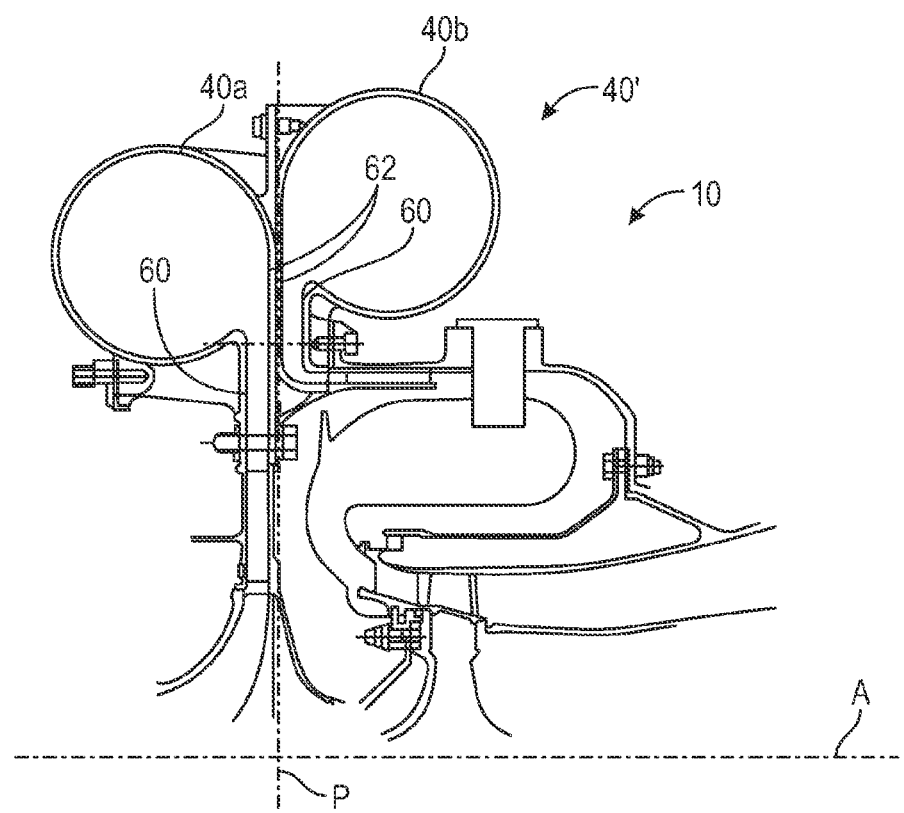
FIG. 6 is a similar view to FIG. 2 and illustrates a second embodiment of the invention.

FIG. 6 illustrates another embodiment of an aircraft turbomachine 10 according to the invention, which differs from the embodiment of FIG. 2 essentially by its volute assembly 40'.

A first difference between these embodiments is that the volute assembly 40' in FIG. 6 comprises two adjacent annular parts, each part comprising a volute with its conduit and its ports 42, 44, and its walls 60, 62. The walls 62 of the ports 44 are therefore not merged, but are instead independent and applied to each other.

Here the walls 62 extend in the plane of junction P of the volutes. The walls 60, 62 are parallel to each other and to the plane P. The plane P here extends just downstream of the diffuser 34.

Compared to the axial positions of the volutes 40a, 40b in FIG. 2, the volutes in FIG. 6 are further downstream.

In another embodiment of a turbomachine 10 according to the invention, which is not shown in the drawings, the diffuser 36 could have, not a generally cylindrical shape with an axial inlet 36a and outlet 36b, but rather a generally frustoconical shape with the inlet oriented axially but the outlet oriented radially inwards and thus in the direction of the axis A.

In another variant, not shown, the volutes could be covered with a thermally insulating layer. This layer could be interposed between the two walls 62 of the variant of embodiment shown in FIG. 6 for example. This layer could be formed by an insulating material or even air.

The present invention also relates to a method for manufacturing an aircraft turbomachine.

As mentioned above, a turbomachine can be either a conventional cycle or a recovered cycle and the present method proposes to manufacture the turbomachine according to the choice of the manufacturer among these cycles.

The method thus comprises a first step a) of determining the cycle of the turbomachine, among a conventional cycle and a recovered cycle.

The method then comprises a second step b1) or b2) depending on the choice of the first step.

In the case of a conventional cycle, the step b1) consists of connecting the outlet 34b of the diffuser 34 to the inlet 36a of the rectifier 36 in the scope of the turbomachine 10 of FIG. 2 or 6.

Figure 8:
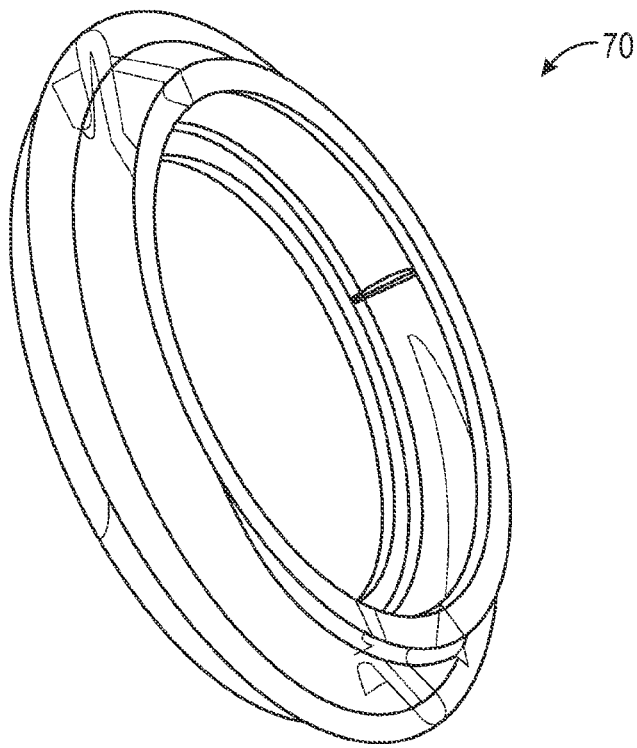
FIG. 8 is a schematic perspective view of an annular connecting element according to the invention.
Figure 9:
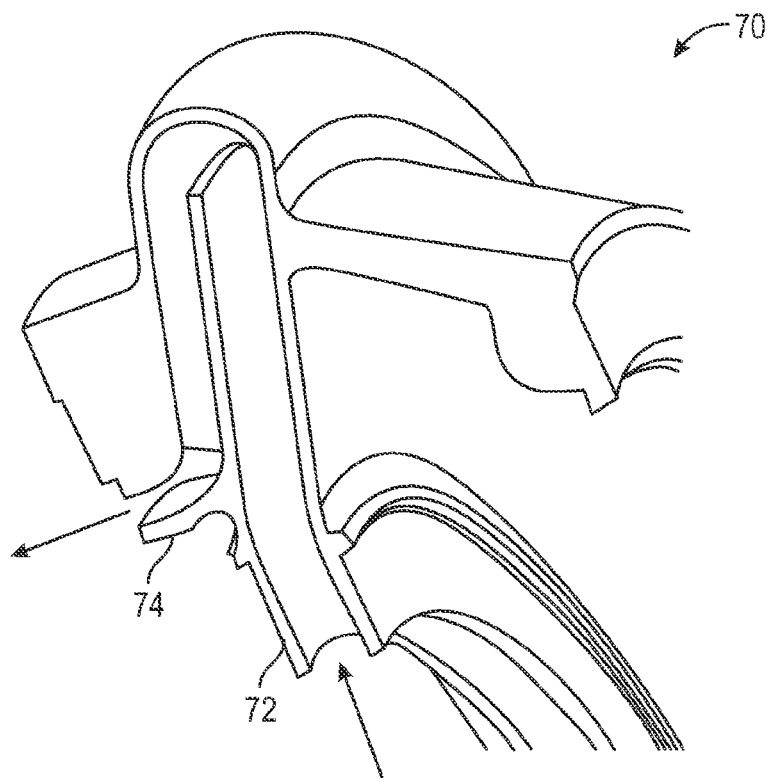
FIG. 9 is a schematic axial sectional view of the annular element in FIG. 8.

The outlet of the diffuser 34 may be directly connected to the inlet 36a of the rectifier 36, as in the example shown in FIGS. 8 and 9. The direct connection is carried out here by an annular element 70 which extends around the axis A and defines an air passage duct 72 which is generally U-shaped in axial cross-section (see FIG. 9).

This element 70 comprises a first annular connector 72 which is oriented radially inwardly with respect to the axis A and which is connected to the outlet 34b of the diffuser 34, and a second annular connector 74 which is oriented substantially axially and which is connected to the inlet 36a of the rectifier 36. The first and second connectors 72, 74 are respectively located at the ends of the U-shaped duct.

The element 70 can be clamped to the casing 29 for example.

In the case of a recovered cycle, the step b2) consists of equipping the turbomachine with the volute assembly 40 described above, or even with a heat exchanger 38 if this is not already the case.

The ports 42, 42 of the volutes 40a, 40b are connected to the inlet 36a of the diffuser, the outlet 34b of the rectifier 34 and the exchanger 38, as mentioned above.

In the case of a maintenance of the turbomachine and the identification of a malfunction, it is possible to convert the recovered cycle turbomachine to a conventional cycle turbomachine.

Figure 7:
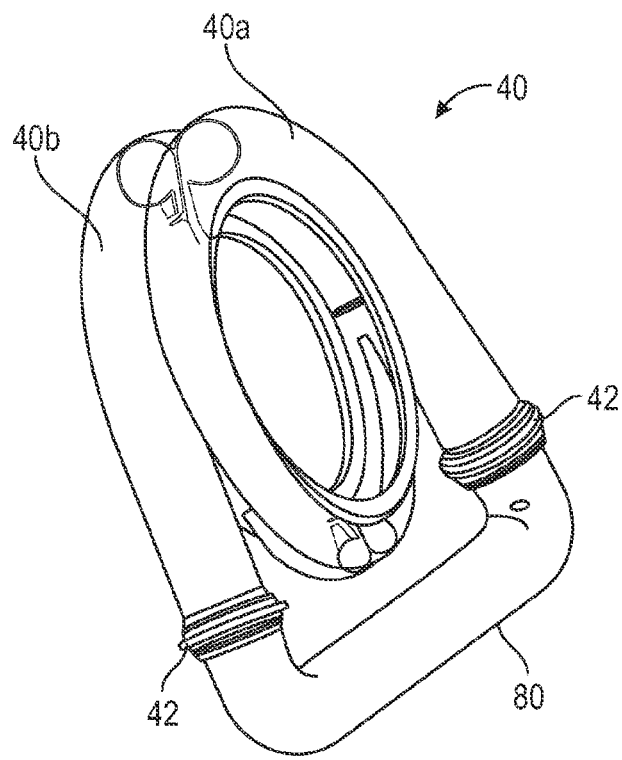
FIG. 7 is a schematic perspective view of a volute assembly according to an alternative embodiment of the invention.

To this end, the method comprises a further step consisting in connecting the ports 42 of the volutes 40a, 40b to each other by a bypass conduit 80, as illustrated in FIG. 7.

It is thus understood that, although the compressed air leaving the diffuser 34 is injected into the volute 40a and circulates to its port 42, this compressed air will flow through the conduit 80 to the port 42 of the other volute 40b to supply the rectifier 36. The compressed air is therefore not heated, which confirms that the turbomachine is a conventional cycle.

The invention claimed is:

1. An aircraft turbomachine, comprising:
   a centrifugal compressor extending around an axis A,
   an annular combustion chamber extending around the axis A,
   a system for diffusing and rectifying an air flow leaving the centrifugal compressor to supply the combustion chamber, this system comprising:
   an annular diffuser which is oriented substantially radially and which comprises an inlet supplied by the centrifugal compressor, and
   an annular rectifier which comprises an outlet for supplying the combustion chamber, and
   a heat exchanger, this exchanger comprising:
   a first circuit supplied with exhaust gases from the turbomachine, and
   a second circuit comprising an inlet connected by a first volute to an outlet of the diffuser, and an outlet connected by a second volute to an inlet of the rectifier, the first and second volutes being joined together and each comprising an annular conduit wound around the axis A, the first and second volutes each comprising a first port located at the external periphery of the conduit and oriented in a tangential direction, and a second port located at the internal periphery of the conduit and oriented in a radial direction, the conduit of each of the volutes having an evolving passage cross-section which is maximum at the level of the first port and minimum at a circumferential end of the conduit opposite the first port, wherein the volutes have reversed winding directions so that their first ports are formed by conduit portions spaced apart from each other and the minimum cross-section of each conduit is located at the level of a larger cross-section of the other conduit.

2. The turbomachine according to claim 1, wherein each of the volutes has circular or oval shaped passage cross-sections extending over an angle ($\beta$) of at least 220°.

3. The turbomachine according to claim 1, wherein the second port of each volute comprises two annular walls extending about the axis A and defining between them an air passage duct.

4. The turbomachine according to claim 3, wherein the two walls of the second port are substantially parallel and project from an annular skin of the volute, this skin extending about the axis A and having in axial cross-section a circular or oval shape to form said conduit.

5. The turbomachine according to claim 4, wherein one of the walls of the second port of the first volute is coincident with one of the walls of the second port of the second volute.

6. The turbomachine according to claim 4, wherein the walls of the second port of the first volute have free ends opposite the skin, which define a substantially radially oriented connector for connection to the outlet of the diffuser, and the walls of the second port of the second volute have free ends opposite the skin, which define a substantially axially oriented connector for connection to the inlet of the rectifier.

7. The turbomachine according to claim 4, wherein the walls of the second ports have flat shapes and perpendicular to the axis A, or have frustoconical shapes converging from upstream to downstream towards the interior.

8. The turbomachine according to claim 4, wherein the skin and the walls have substantially a same thickness.

9. The turbomachine according to claim 1, wherein it further comprises an external casing which extends around the axis A and surrounds the combustion chamber, the volutes being spaced from the casing and attached to the latter by flanges.

10. The turbomachine according to claim 1, wherein the winding direction of a volute is the direction in which the conduit of the volute winds from the first port of the volute.

11. The turbomachine according to claim 1, wherein one of the first and second volutes has a winding direction which is clockwise, the other of the first and second volutes having a winding direction which is counterclockwise.

12. The turbomachine according to claim 1, wherein the first port of the first volute and the first port of the second volute are distinct and spaced from each other.

13. The turbomachine according to claim 1, wherein the first port of the first volute and the first port of the second volute are opposite with respect to the axis A.

14. A turbomachine comprising:
a combustion chamber; and
a volute assembly, said volute assembly comprising first and second volutes which are axially joined together, each including an annular conduit wound around an axis A, the first and second volutes each comprising a first port located at the external periphery of the conduit and oriented in the tangential direction, and a second port located at the internal periphery of the conduit and oriented in the radial direction, the second ports of the volutes opening onto an outside of the volute assembly, the conduit of each of the volutes having an evolving passage cross-section which is maximum at the level of the first port and minimum at a circumferential end of the conduit opposite the first port, the volutes having reversed winding directions so that their first ports are formed by conduit portions spaced apart from each other and the minimum cross-section of each conduit is located at the level of a larger cross-section of the other conduit, wherein at least one of the second ports of the volutes extends from an annular rectifier of the combustion chamber.

15. The assembly according to claim 14, wherein the first ports of the volutes are connected to each other by a bypass conduit.

16. The assembly according to claim 14, wherein the winding direction of a volute is the direction in which the conduit of the volute winds from the first port of the volute.

17. The assembly according to claim 14, wherein one of the first and second volutes has a winding direction which is clockwise, the other of the first and second volutes having a winding direction which is counterclockwise.

18. The assembly according to claim 14, wherein the first port of the first volute and the first port of the second volute are distinct and spaced from each other.

19. The assembly according to claim 14, wherein the first port of the first volute and the first port of the second volute are opposite with respect to the axis A.

20. The assembly according to claim 14, wherein the second port of the first volute projects radially from the conduit of the first volute towards the axis A, the second port of the second volute projecting radially from the conduit of the second volute towards the axis A.

21. A method for manufacturing an aircraft turbomachine, said turbomachine comprising:
a centrifugal compressor extending around an axis A,
an annular combustion chamber extending around the axis A,
a system for diffusing and rectifying an air flow leaving the centrifugal compressor to supply the combustion chamber, this system comprising:
an annular diffuser which is oriented substantially radially and which comprises an inlet supplied by the centrifugal compressor, and
an annular rectifier which comprises an outlet for supplying the combustion chamber,
wherein the method comprises a step of: equipping the turbomachine with a volute assembly, said assembly comprising first and second volutes which are axially joined together, each including an annular conduit wound around an axis A, the first and second volutes each comprising a first port located at the external periphery of the conduit and oriented in the tangential direction, and a second port located at the internal periphery of the conduit and oriented in the radial direction, the second ports of the volutes opening onto an outside of the volute assembly, the conduit of each of the volutes having an evolving passage cross-section which is maximum at the level of the first port and minimum at a circumferential end of the conduit opposite the first port, the volutes having reversed winding directions so that their first ports are formed by conduit portions spaced apart from each other and the minimum cross-section of each conduit is located at the level of a larger cross-section of the other conduit, the first and second volutes being non-communicating with each other, a first of the volutes having its second port connected to the outlet of the diffuser, and the second of the volutes having its second port connected to the inlet of the rectifier.

* * * * *